United States Patent
Kim et al.

(10) Patent No.: US 9,576,363 B2
(45) Date of Patent: Feb. 21, 2017

(54) OBJECT PICKING SYSTEM, OBJECT DETECTING DEVICE, OBJECT DETECTING METHOD

(71) Applicant: Electronics and Telecommunications Research Institute, Daejeon (KR)

(72) Inventors: Kye Kyung Kim, Daegu (KR); Sang Seung Kang, Daejeon (KR); Jae Yeon Lee, Daejeon (KR); Jae Hong Kim, Daejeon (KR); Joong Bae Kim, Daejeon (KR); Jong Hyun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 25 days.

(21) Appl. No.: 14/621,329

(22) Filed: Feb. 12, 2015

(65) Prior Publication Data
US 2015/0262012 A1 Sep. 17, 2015

(30) Foreign Application Priority Data
Mar. 12, 2014 (KR) .......................... 10-2014-0029137

(51) Int. Cl.
*G06K 9/00* (2006.01)
*G06T 7/00* (2006.01)
*G06K 9/32* (2006.01)

(52) U.S. Cl.
CPC ............. *G06T 7/004* (2013.01); *G06K 9/3241* (2013.01); *G06T 7/0046* (2013.01); *G06K 2209/19* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 2006/0104788 A1* | 5/2006 | Ban | B25J 9/1697 414/729 |
| 2009/0033655 A1* | 2/2009 | Boca | B25J 9/1697 345/419 |
| 2009/0116728 A1 | 5/2009 | Agrawal et al. | |
| 2011/0098859 A1* | 4/2011 | Irie | B25J 9/1687 700/259 |
| 2012/0158180 A1 | 6/2012 | Iio et al. | |
| 2013/0035081 A1* | 2/2013 | Sanger | G06K 9/228 455/414.2 |
| 2013/0266205 A1* | 10/2013 | Valpola | B25J 9/1669 382/153 |
| 2014/0193039 A1* | 7/2014 | Wexler | G01C 11/04 382/106 |

FOREIGN PATENT DOCUMENTS

| | | | |
|---|---|---|---|
| JP | 2009-115783 A | 5/2009 | |
| JP | 2012-125886 A | 7/2012 | |

* cited by examiner

*Primary Examiner* — Bhavesh Mehta
*Assistant Examiner* — Oneal R Mistry

(57) ABSTRACT

The present invention relates to a device and a method of detecting arbitrarily piled objects, and a device and a method for picking a detected object. The present invention may provide a device and a method of detecting an object, which extract a unique local characterized part of the object by using a visual sensor, detect an object region, and estimate a posture from the detected object region. Also the present invention may provide an object picking system capable of being applied to an actual production process, such as assembling or packaging, in a cell producing method.

12 Claims, 8 Drawing Sheets

| SERIAL NO. (RECORD) | DISTANCE BETWEEN OBJECT MODEL AND VISUAL SENSOR (cm) | ROTATION ANGLE | | | OBJECT REGION FORMED WITH COMBINATION OF LOCAL CHARACTERISTICS |
|---|---|---|---|---|---|
| | | x-AXIS | y-AXIS | z-AXIS | |
| 1 | 50 | -30 | -30 | -30 |  |
| 2 | 50 | -29.5 | -30 | -30 | ⋮ |
| 3 | 50 | -29 | -30 | -30 | ⋮ |
| ⋮ | ⋮ | ⋮ | ⋮ | ⋮ | ⋮ |
| 60 | 50 | 30 | -30 | -30 | ⋮ |
| 61 | 50 | -30 | -29.5 | -30 | ⋮ |
| 62 | 50 | -29.5 | -29.5 | -30 | ⋮ |
| 63 | 50 | -29 | -29.5 | -30 | ⋮ |
| ⋮ | ⋮ | ⋮ | ⋮ | ⋮ | ⋮ |
| 120 | 50 | 30 | -29.5 | -30 | ⋮ |
| ⋮ | ⋮ | ⋮ | ⋮ | ⋮ | ⋮ |
| ⋮ | 50 | -30 | 30 | -30 | ⋮ |
| ⋮ | 50 | -29.5 | | | |
| | 50 | | | | |

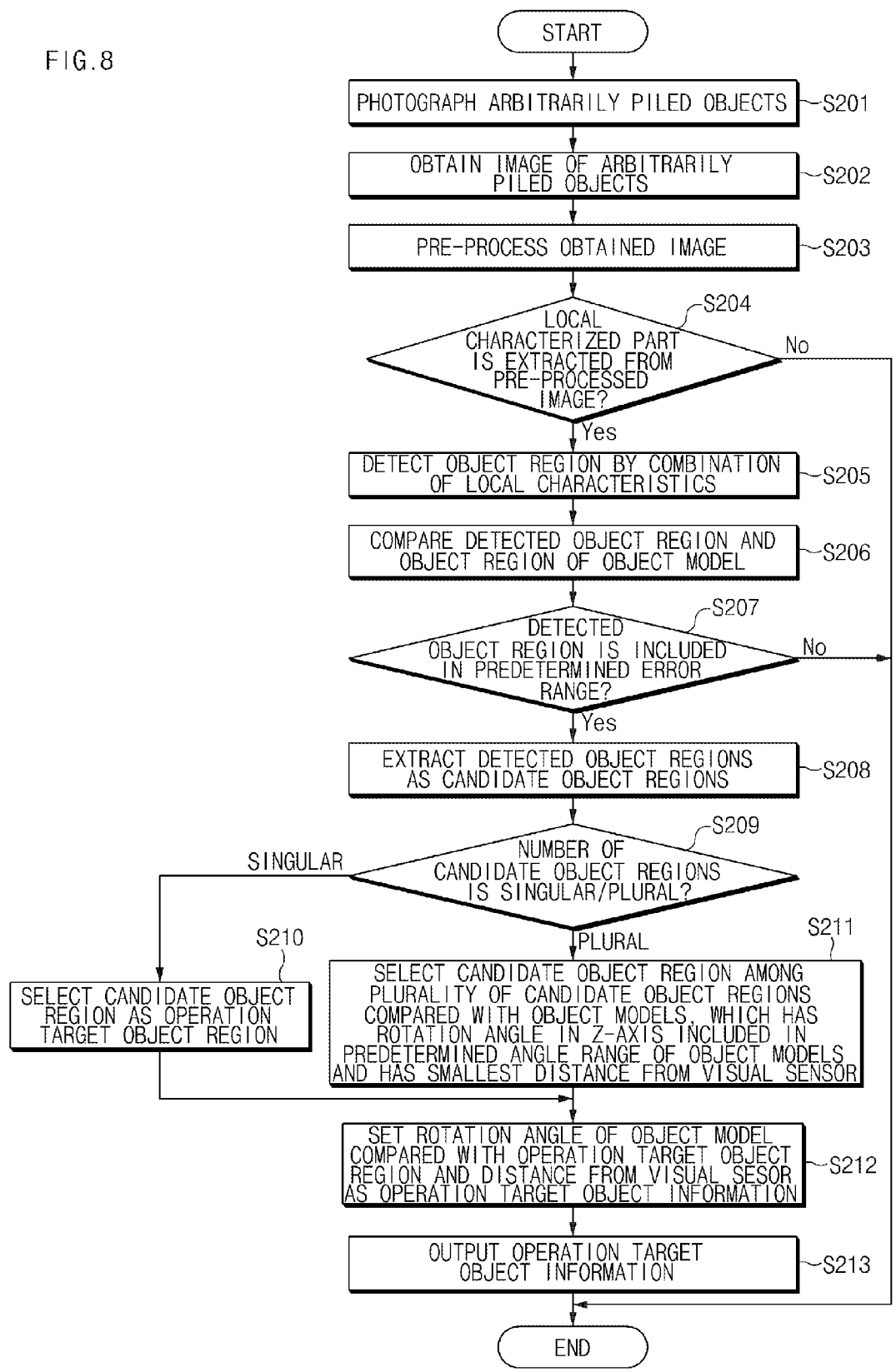

OBJECT PICKING SYSTEM, OBJECT DETECTING DEVICE, OBJECT DETECTING METHOD

CROSS-REFERENCE TO RELATED APPLICATIONS

This application claims priority to and the benefit of Korean Patent Application No. 10-2014-0029137 filed in the Korean Intellectual Property Office on Mar. 12, 2014, the entire contents of which are incorporated herein by reference.

TECHNICAL FIELD

The present invention relates to an object picking system, and a device and a method of detecting an object, and more particularly, to an object picking system, and a device and a method of detecting an object, which detect an arbitrarily piled object and pick the detected object.

BACKGROUND ART

In order to reduce a burden to establish a production line and effectively improve productivity, a cell producing method based on a visual sensor has been introduced. Due to the improvement in the performance of the visual sensor and recognition technology, the cell producing method based on the visual sensor can be used. The cell producing method based on the visual sensor enables a robot to automatically recognize objects laid around a robot, instead of a worker, and automatically executes a packaging process, an assembling process, and the like, similar to the performance by the worker. An action for actually implementing the cell producing method based on the visual sensor in a field is active.

In the cell producing method, bin-picking of detecting one object region among several objects piled in a pile is used. In the bin-picking, it is very difficult to extract a region of one object, which is to be picked, and a rotation angle of a surface of an object due to a lighting condition of a field, various postures of piled objects, and variety of a material of the surface of the object. Accordingly, it is difficult to apply the bin-picking technology using a previously developed stereo camera or 3D visual sensor to a field due to low recognition performance and reliability.

Particularly, since the piled objects may overlap each other, a partial region of the object may be hidden or the surface of the object may be rotated. This distorts a unique local characteristic of the object. Accordingly, there is a problem in that it is difficult to detect an object region and estimate an object posture.

SUMMARY OF THE INVENTION

The present invention has been made in an effort to provide a device and a method of detecting an object, which extract a unique local characterized part of the object by using a visual sensor, detect an object region, and estimate a posture from the detected object region.

The present invention has been made in an effort to provide an object picking system capable of being applied to an actual production process, such as assembling or packaging, in a cell producing method.

An exemplary embodiment of the present invention provides a device for detecting an object of the present invention, including: an image obtaining unit configured to obtain an image of objects from a visual sensor; a local characteristic extracting unit configured to extract one or more local characterized parts from the image; an object region detecting unit configured to detect one or more object regions by a combination of the one or more extracted local characterized parts; a storage unit configured to store rotation angles of object models for the objects, and an object region of the object model obtained for each predetermined rotation angle; an object region comparing unit configured to compare the one or more object regions detected from the object region detecting unit with the object regions of the object models stored in the storage unit, and extract one or more candidate object regions; an operation target object region selecting unit configured to select a candidate object region conforming to a predetermined determination reference among the one or more candidate object regions as an operation target object region; and an output unit configured to output a rotation angle of the object model compared with the operation target object region as operation target object information.

The object region comparing unit may compare one or more detected object regions and the object regions of the object models stored in the storage unit and determine whether the one or more detected object regions are included within a predetermined error range, and extract the object region included in the predetermined error range as the one or more candidate object region.

When the number of one or more candidate object regions is singular, the operation target object region selecting unit may select the single candidate object region as the operation target object region, and when the number of one or more candidate object regions is plural, the operation target object region selecting unit may select a candidate object region having the smallest absolute value of the rotation angle among the object models compared with the plurality of candidate object regions as the operation target object region.

The storage unit may store the rotation angle of the object model for the objects, the distance from the object model to the visual sensor, and an object region of the object model obtained for each predetermined rotation angle and the predetermined distance.

When the number of one or more candidate object regions is singular, the operation target object region selecting unit may select the single candidate object region as the operation target object region, and, when the number of one or more candidate object regions is plural, the operation target object region selecting unit may select the operation target object region based on the rotation angles for the object models compared with the plurality of candidate object regions and the distance from the visual sensor, and the output unit may output the rotation angle of the object model compared with the operation target object region and the distance from the visual sensor as the operation target object information.

When the number of one or more candidate object regions is plural, the operation target object region selecting unit may select a candidate object region among the candidate object regions compared with the object models, which has a rotation angle included in a predetermined range of the rotation angles of the object models, and has the smallest distance from the visual sensor, as the operation target object region.

The device for detecting the object further includes an image pre-processing unit configured to pre-process the obtained image, in which the local characteristic extracting unit extracts the one or more local characterized parts from the image pre-processed by the image pre-processing unit.

Another exemplary embodiment of the present invention provides a picking system, including: the device for detecting an object cording to the exemplary embodiment; a picking robot controller; and a picking robot accessed with the picking robot controller, in which the picking robot controller controls the picking robot to pick an operation target object corresponding to operation target object information based on the operation target object information output from the output unit.

According to the object detecting device and the object detecting method of the present invention, a rotation angle of an object region formed with a unique local characterized part of the object and a distance from the visual sensor are considered, thereby improving reliability in the detection of the object.

A general 2D visual sensor, not a stereo camera or a 3D visual sensor, is used, thereby being advantageous in establishment cost of object detection and bin-picking operation environments.

The object region formed with the local characterized part is compared with pre-stored data of the database, so that it is not necessary to measure a rotation angle of an object and a distance to an object whenever the object to be picked is detected, thereby reducing consumed time.

According to the object picking system and the object picking method of the present invention, it is possible to actually pick an operated object detected with high accuracy, thereby implementing a bin-picking system based on a visual inspection applicable to an actual production process.

BRIEF DESCRIPTION OF THE DRAWINGS

FIG. 8 is a flowchart illustrating an object detecting method according to exemplary embodiment 2 of the present invention.

Figure 1:
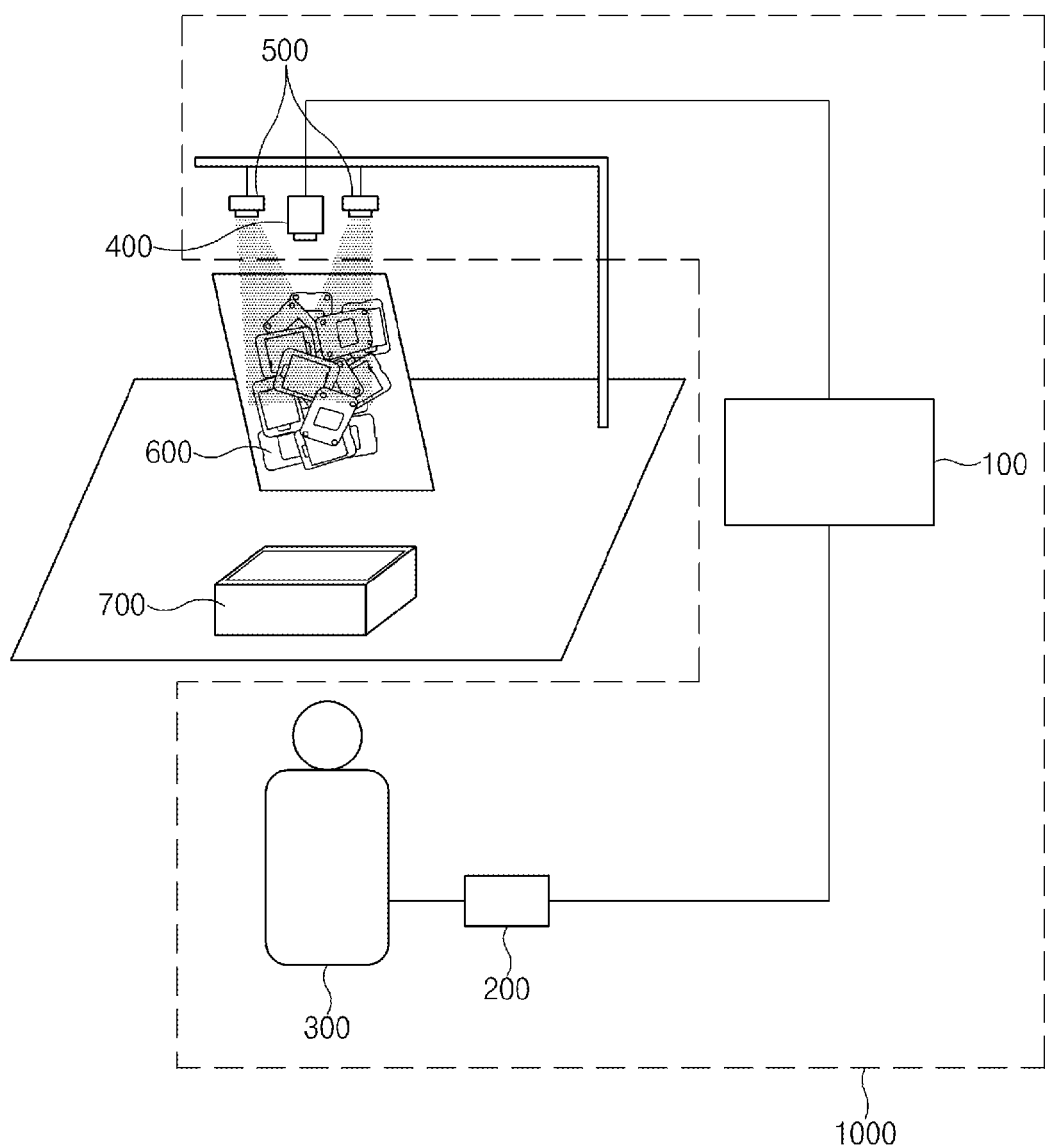
FIG. 1 is a diagram illustrating an object picking system of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings, but the present invention is not restricted or limited by the exemplary embodiment. For reference, in the description, the same reference numeral substantially denotes the same element, and under this rule, contents described in other drawings may be referred for description. Contents determined to be apparent to those skilled in the art or repeated will be omitted.

[Object Picking System]

FIG. 1 is a diagram illustrating an object picking system of the present invention. Hereinafter, an object picking system 1000 according to the present invention will be described with reference to FIG. 1.

In FIG. 1, the object picking system 1000 according to the present invention includes an object detecting device 100, a picking robot controller 200, a picking robot 300, a visual sensor 400 for detecting an object, and a lighting device 500 for reducing a light reflection influence.

The object detecting device 100 performs image-processing on detection target objects 600 which are obtained from the visual sensor 400 and arbitrarily piled, and transmits information on an operation target object, which is to be described below, to the picking robot controller 200. The picking robot controller 200 controls the picking robot 300 based on the operation target object information. The picking robot 300 picks the operation target object and moves the picked operation target object to an objective bin 700. In this case, the objective bin 700 may be a packaging container for packaging the picked operation target object. The objective bin 700 may also be a to-be-assembled target assembled with the picked operation target object.

According to the object picking system 1000, it is possible to actually pick the operation target object with high accuracy, so that a bin picking system based on a visual inspection applicable to an actual production process may be implemented. Hereinafter, a configuration of the object detecting device 100 of the object picking system 1000 and an object detecting method will be described.

Exemplary Embodiment 1

Figure 2:
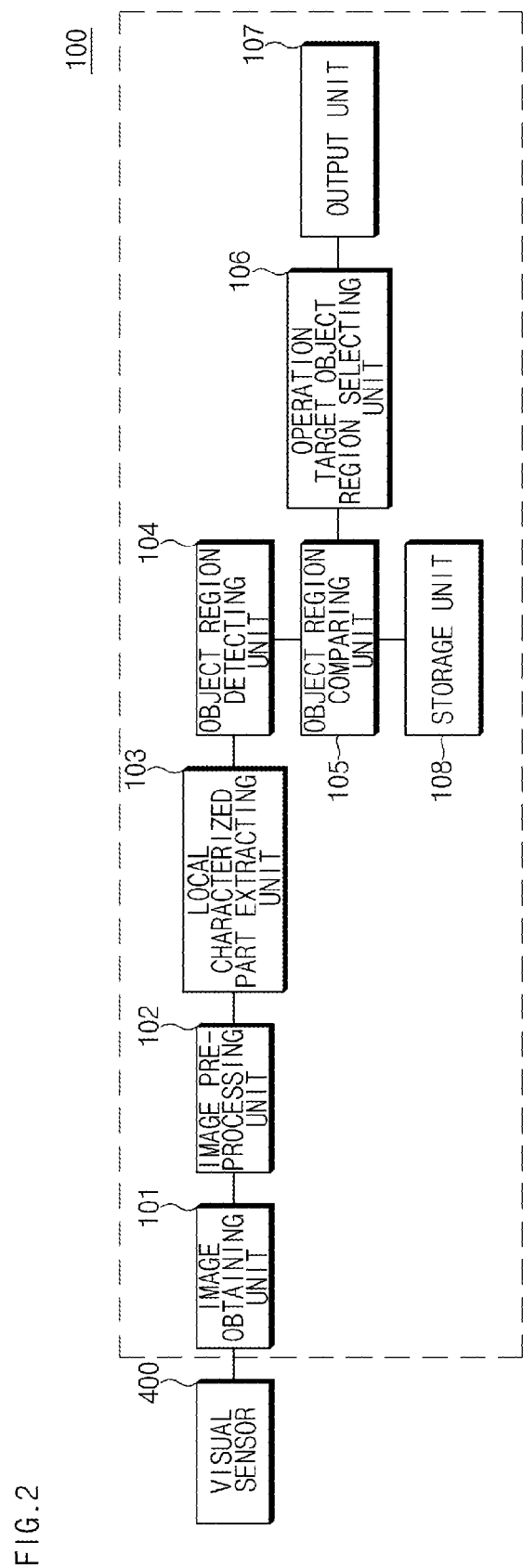
FIG. 2 is a diagram illustrating a configuration of an object detecting device according to exemplary embodiment 1 of the present invention.
Figure 3:
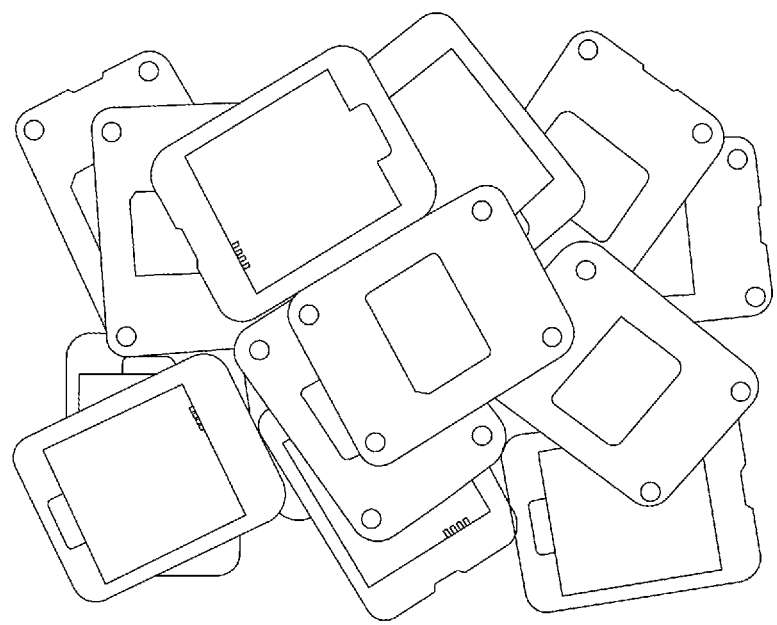
FIG. 3 is a diagram illustrating an example of an image of objects obtained from a visual sensor.
Figure 4:
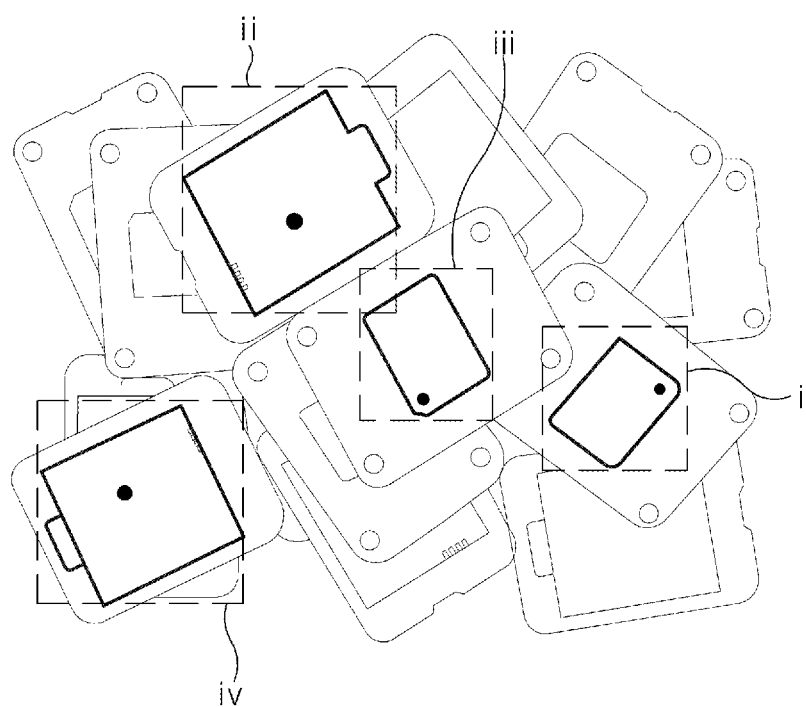
FIG. 4 is a diagram illustrating an object region formed by local characterized parts after the image of FIG. 3 is post-processed.

FIG. 2 is a diagram illustrating a configuration of the object detecting device according to exemplary embodiment 1 of the present invention, and FIG. 3 is a diagram illustrating an example of an image of objects obtained from a visual sensor 400. FIG. 4 is a diagram illustrating an object region formed by local characterized parts after the image of FIG. 3 is post-processed.

Referring to FIG. 2, the object detecting device 100 includes an image obtaining unit 101, an image pre-processing unit 102, a local characterized part extracting unit 103, an object region detecting unit 104, an object region comparing unit 105, an operation target object region selecting unit 106, an output unit 107, and a storage unit 108.

The image obtaining unit 101 obtains an image obtained from the visual sensor 400, for example, an image illustrated in FIG. 3. The visual sensor 400 may be an image or a 2D image obtained by a typical 2D visual sensor (or camera), not a stereo camera or a 3D visual sensor. The image obtaining unit 101 obtains the 2D image (for example, the image of FIG. 3), and transmits the obtained 2D image to the image pre-processing unit 102.

The image pre-processing unit 102 improves and pre-processes the image in order to extract the local characterized parts of the object without distortion. In an actual field, a form configuring the object or information on a local characterized part may be lost due to an influence of lighting and a material of a surface of the object. Accordingly, the image pre-processing unit 102 performs image filtering, by which an influence by the lighting is reduced and the local characterized parts of the object are preserved without loss, and image pre-processing including an analysis of a brightness value of a pixel for each local region and the like. As an example of a result of the image pre-processing, a grey or binary image is generated.

In the meantime, the image pre-processing unit 102 may be omitted when the information on the local characterized part of the object is not lost by the influence of the lighting and the like.

The local characterized part extraction unit 103 extracts at least one local characterized part from the image received from the image pre-processing unit 102. The local characterized part is a concept including a blob, an edge, and a corner point in the 2D image, and is utilized as primary information for detecting arbitrarily piled objects. Accordingly, the one or more extracted local characterized parts are transmitted to the object region detection unit 104 in order to form an object region of one object.

The object region detection unit 104 detects object regions in the obtained 2D image by combining the one or more received local characterized parts. The object region is a region identified as one object by a combination of the local characterized parts, and for example, four object regions i to iv illustrated in FIG. 4 correspond to the object region for the image of FIG. 3. That is, the object region detecting unit 104 analyzes the local characterized part. When a local characterized part cannot reach a predetermined threshold value for forming one object region because a part of the object overlaps and is hidden, the object region detecting unit 104 excludes the corresponding local characterized part from the object region, and detects the object region only with the remaining local characterized part.

The object region comparing unit 105 compares the one or more object regions detected by the object region detecting unit 104 and object regions of an object model stored in the storage unit 108, which will be described below, and extracts one or more candidate object region. A chamfer matching method, an image moment comparing method, or the like may be used as a method of comparison. That is, the object region comparing unit 105 compares the one or more detected object regions and the object regions of the object models stored in the storage unit 108 by using the comparing method, and determines whether the one or more detected object regions are included in a predetermined error range. Through the determination, the object region comparing unit 106 extracts the object regions, which are included in the predetermined error range, as the one or more candidate object regions.

The operation target object region selecting unit 106 selects a candidate object region conforming to a predetermined determination reference among the one or more extracted candidate object regions as an operation target object region. In this case, a rotation angle of the object model compared with the one or more candidate object regions stored in the storage unit 108 may be used as the determination reference for selecting the operation target object region. For example, the operation target object region selecting unit 106 may select the candidate object region having the smallest rotation angle among the rotation angles in the z-axis corresponding to the object region of the object model, which is compared with the one or more candidate object regions, as the object region. In this case, the rotation angle is not limited to the z-axis, and any one among the rotation angles in the x, y, or z-axis direction, and the operation target object region selecting unit 106 may select the candidate object region having the smallest angle in the rotation angles in the determined axis direction as the operation target object region. The operation target object region selecting unit 106 may calculate an arithmetical average of the rotation angles of the x, y, and z-axis directions, and select the operation target object region based on the calculated arithmetical average.

In the meantime, when only one candidate object region is detected, the one detected candidate object region may be selected as the operation target object region.

The output unit 107 transmits the operation target object information including the rotation angle for the operation target object corresponding to the operation target object region selected by the operation target object region selection unit 106 to the picking robot controller 200.

The storage unit 108 configures the object regions of the object models for the objects 600, the rotation angles according to the rotation in the x, y, and z-axis directions, and the distance from the visual sensor 400 into a database, and stores them (the database will be described below). The stored object region of the object model is referred by the object region comparing unit 106, and the rotation angle and the distance from the visual sensor 400 is used for the selection of the operation target object region by the operation target object region selecting unit 107.

[Example of the Database]

Figure 5:
FIG. 5 is a diagram illustrating a table about a database stored in a storage unit of the object detecting device according to exemplary embodiment 1 of the present invention.

FIG. 5 is a diagram illustrating a table about the database stored in the storage unit 108 of the object detecting device 100 according to exemplary embodiment 1 of the present invention. FIG. 5 represents a table in which an object region of an object model of an object, which is to be detected, the rotation angles according to the rotation in the x, y, and z-axis directions, and the distance from the visual sensor 400 are configured into the database.

In the table of FIG. 5, in the case where the distance between the object model and the visual sensor 400 is within 50 to 100 cm, and the rotation angles of the x, y, and z-axes are in the range of −30° to 30°, the object region of the object model is detected by moving the object model every 1 cm, and rotating the object model every 0.5°.

In this case, the rotation angles of 30° to 30° in the x, y, and z-axes mean the range of the rotation angles in the x, y, and z-axes at which the picking robot 300 is capable of picking the object. The range of the rotation angles may be changed according to the type of picking robot 300. The distance of 50 to 100 cm between the object model and the visual sensor 400 may be variously set according to an intention of a user.

In the meantime, in the distance between the object model and the visual sensor 400, and the rotation angles in the x, y, and z-axes, the object region of the object model is formed by pre-processing the image photographed by the visual sensor 400, and combining the local characterized parts extracted from the pre-processed image.

The object region may be used automatically or manually detected. In order to prevent the generation of the excessively large number of records, the obtainment of the object region by using 3D scanning or 3D CAD may be considered.

[Object Detecting Method]

Figure 6:
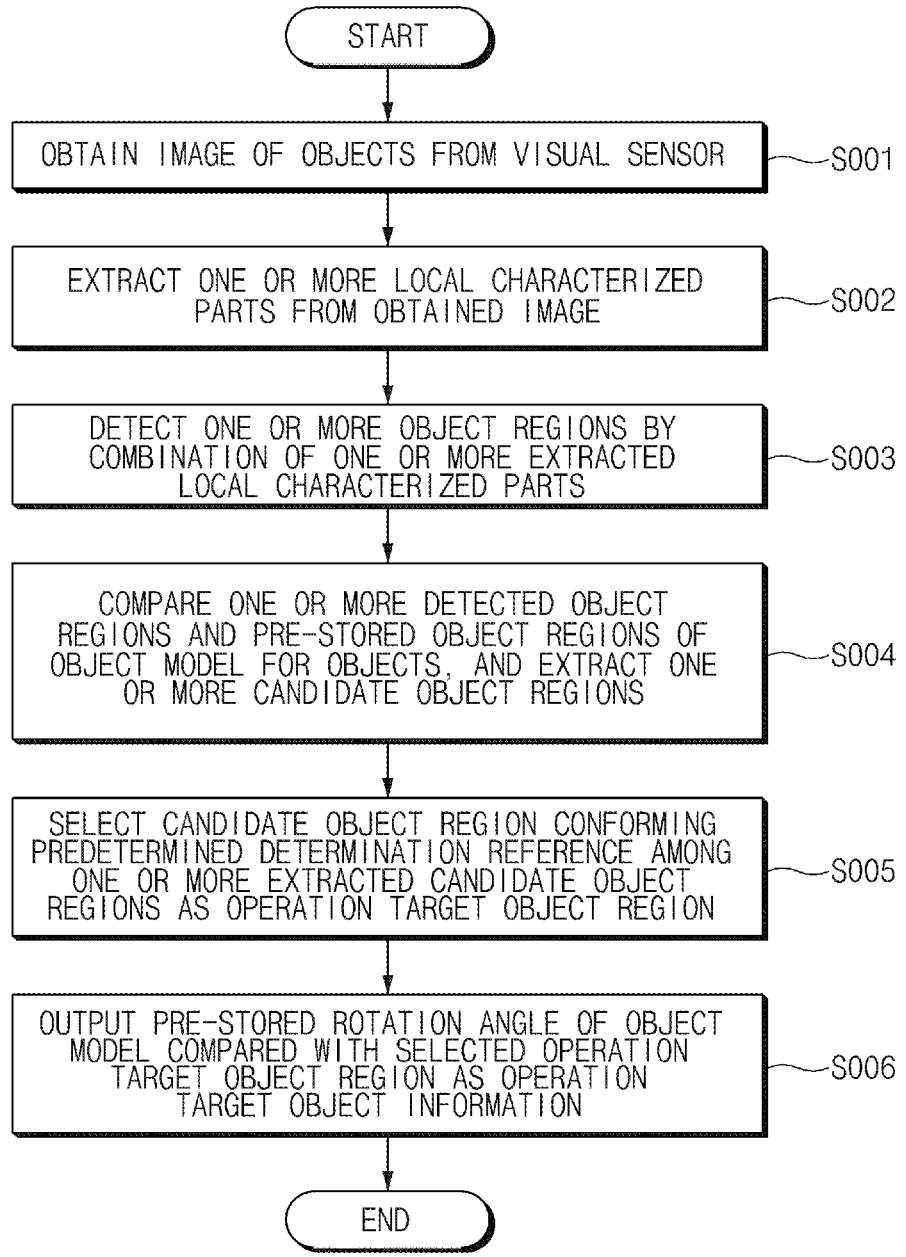
FIG. 6 is a flowchart illustrating an object detecting method according to the present invention.

FIG. 6 is a flowchart illustrating an object detecting method according to the present invention. A flow of the object detecting method according to the present invention will be described with reference to FIG. 6.

The object detecting method according to the present invention includes operation 5001 of obtaining an image of objects from the visual sensor, operation S002 of extracting one or more local characterized part of the image, operation S003 of detecting one or more object regions by the combination of the one or more extracted local characterized parts, operation S004 of comparing the one or more detected object regions and pre-stored object regions of the object models for the objects and extracting one or more candidate object regions, operation S005 of selecting a candidate object region conforming to a predetermined determination reference among the one or more candidate object regions as an operation target object region, and operation S006 of outputting a pre-stored rotation angle for the object model compared with the operation target object region as operation target object information.

Hereinafter, the object detecting method according to the present invention will be described in more detail as an exemplary embodiment.

Object Detecting Method According to Exemplary Embodiment 1

Figure 7:
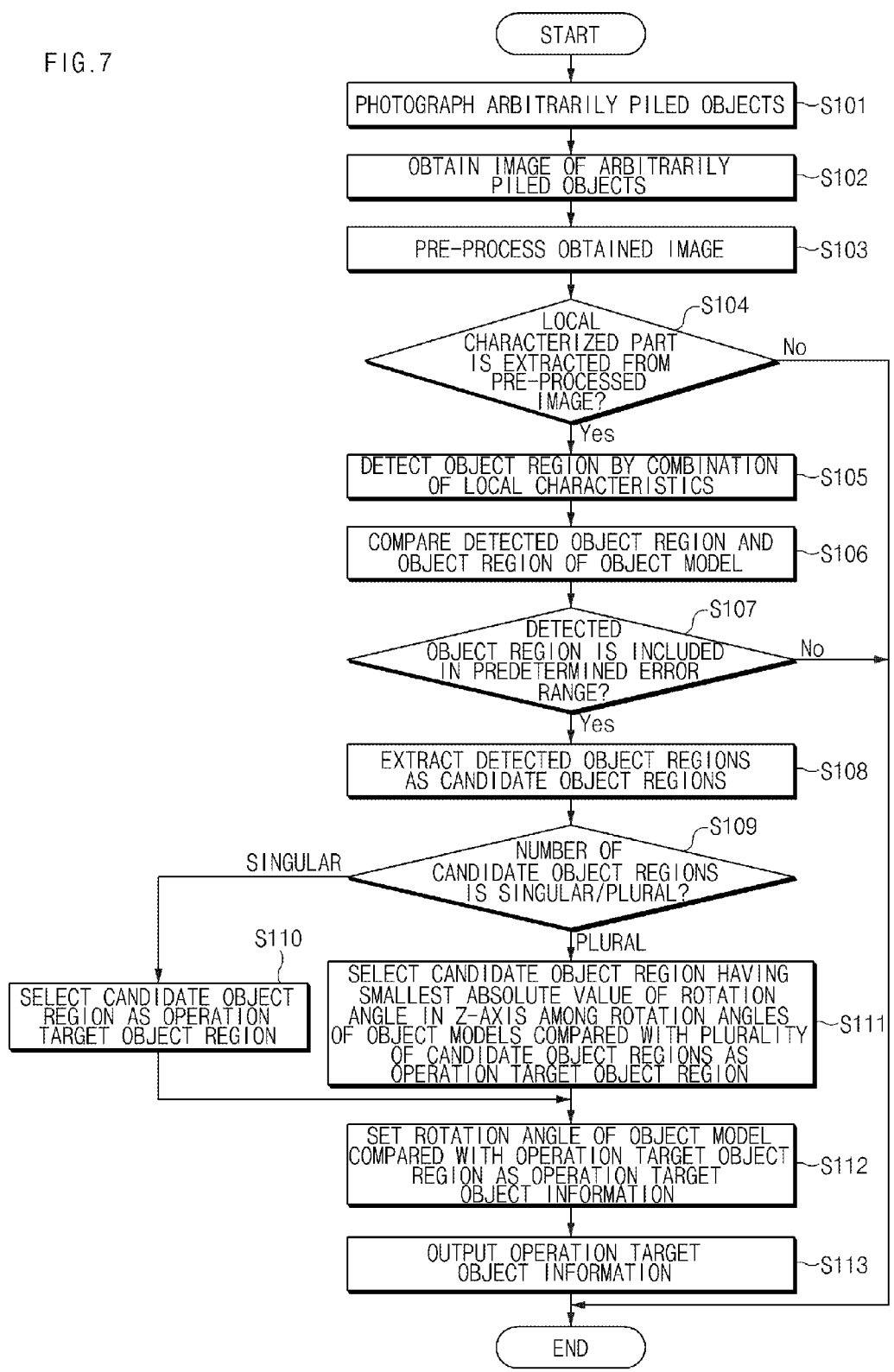
FIG. 7 is a flowchart illustrating an object detecting method according to exemplary embodiment 1 of the present invention.

FIG. 7 is a flowchart illustrating an object detecting method according to exemplary embodiment 1 of the present invention. Hereinafter, the object detecting method according to exemplary embodiment 1 will be described with reference to FIG. 7.

The object detecting method according to exemplary embodiment 1 includes operation S101 of photographing arbitrarily piled objects, operation S102 of obtaining an image of the arbitrarily piled objects, operation S103 of pre-processing the obtained image, operation S104 of determining whether local characterized parts are extracted from the pre-processed image, operation S105 of detecting object regions by a combination of the local characterized parts, operation S106 of comparing the detected object regions and an object region of an object model, operation S107 of determining whether a result of the comparison is included in a predetermined error range, operation S108 of determining the detected object regions as candidate object regions, operation S109 of determining whether the number of candidate object regions is singular or plural, operation S110 of selecting the corresponding candidate object region as an operation target object region when the number of candidate object regions is singular, operation S111 of selecting a candidate object region having the smallest absolute value of a rotation angle in the z-axis among rotation angles of the object models compared with the plurality of candidate object regions when the number of candidate object regions is plural, operation S112 of setting a rotation angle of the object model compared with the operation target object region as operation target object information, and operation of outputting the operation target object information.

First, the visual sensor 400 photographs 2D an image of arbitrarily piled objects 600 (operation S101). The image obtaining unit 101 of the object detecting device 100 according to exemplary embodiment 1 obtains the corresponding image (operation S102). The obtained image may be, for example, the image of FIG. 3.

Next, in operation S103, the image pre-processing unit 102 pre-processes the obtained image in order to extract the local characterized part of the photographed objects without distortion. In the meantime, when the information on the local characterized part of the object is not lost due to an influence of lighting, operation S103 will be omitted.

In operation S104, the local characterized part extracting unit 103 extracts at least one local characterized part, for example, a blob, an edge, and a corner point, from the image pre-processed in operation S103. When the local characterized part is not extracted, the processing is terminated (No in operation S104). However, when one or more local characterized part is extracted (Yes in operation S104), the method proceeds to operation S105.

In operation S105, one or more object regions are detected by combining the one or more local characterized parts extracted by the object region detecting unit 104 in operation S104. In this case, the one or more detected object regions may be the object regions i to iv illustrated in FIG. 4.

Next, the object region comparing unit 105 compares the one or more detected object regions and the object regions of the object models stored in the storage unit 108 (the database), and determines whether the result of the comparison is included in the predetermined error range. When the object region of the object model included in the predetermined error range is present in the storage unit 108 according to the determination, the method proceeds to operation S108, and selects the detected object region included in the predetermined error range as a candidate object region. Otherwise (No in operation S107), the processing is terminated.

In operation S109, it is determined whether the number of candidate object regions by operation S108 is singular or plural. The operation target object region selecting unit 106 selects the single candidate object region as the operation target object region as it is when the number of extracted candidate object regions is single (operation S110). When the number of extracted candidate object regions is plural, the method proceeds to operation S111.

In operation S111, the operation target object region selecting unit 106 refers the rotation angles in the x, y, and z-axes, which correspond to the object regions of the object models compared with the plurality of candidate object regions, respectively, to the storage unit 108. The operation target object region selecting unit 106 selects the candidate object region having the smallest absolute value of the rotation angle among the rotation angles of the z-axis of the object models compared with the candidate object regions as the operation target object region.

However, in operation S111, it is described that the candidate object region having the smallest rotation angle in the z-axis is selected when the operation target object region is selected, but the present invention is not limited to the rotation angle in the z-axis, and the candidate object region having the smallest absolute value of the rotation angle in the x-axis or the rotation angle in the y-axis may be selected. The candidate object region having the smallest value of the arithmetical averages of the rotation angles in the x, y, and z-axes may be selected. If the candidate object region has an angle at which the picking robot can most appropriately grip and pick the object, the candidate object region is sufficiently selected as the operation target object region regardless of a reference based on which the candidate object region is selected.

Next, in operation S112, the rotation angle of the object model compared with the selected object region is set as the operation target object information. The output unit 107 outputs the corresponding operation target object information to the picking robot controller 200 connected with the object detecting device 100 (operation S113), and the method is ended.

According to the object detecting device and the object detecting method according to exemplary embodiment 1, the rotation angle of the object region formed with the unique local characterized parts of the object is considered, thereby improving reliability in the detection of the object.

The general 2D visual sensor, not the stereo camera or the 3D visual sensor, is used, thereby being advantageous in establishment cost of object detection and bin-picking operation environments.

The object region formed with the local characterized parts is compared with the pre-stored object region of the database, so that it is not necessary to measure a rotation angle of an object and a distance to an object whenever the object to be picked is detected, thereby reducing consumed time.

[Object Detecting Method According to Exemplary Embodiment 2]

FIG. 8 is a flowchart illustrating an object detecting method according to exemplary embodiment 2 of the present invention. Hereinafter, the object detecting method according to exemplary embodiment 2 will be described with reference to FIG. 8.

The configuration of the object detecting device according to exemplary embodiment 2 is the same as that of exemplary embodiment 1, so that a detailed description thereof will be omitted. The object detecting device according to exemplary embodiment 2 is similar to the object detecting method according to exemplary embodiment 1 (operations S101 to S110, and S113 of FIG. 7 are the same as operations S201 to S210, and S213, respectively), but operations S111 and S112 of FIG. 7 are different from operations S211 and S212 of FIG. 8, respectively. The descriptions of the same operations as those of the object detecting device according to exemplary embodiment 1 will be omitted.

In operation S211, the operation target object region selecting unit 106 refers to the rotation angles in the x, y, and z-axes, which correspond to the object regions of the object models compared with the plurality of candidate object regions, respectively, and the distance from the visual sensor 400 to the storage unit 108. The operation target object region is selected based on the rotation angles and the distance.

Particularly, the operation target object region selecting unit 106 may pre-set a predetermined angle range of the rotation angle in the z-axis, and then select the candidate object region among the candidate object regions compared with the object models, which has a rotation angle in the z-axis included in a predetermined range of the rotation angles in the z-axis of the object models, and has the smallest distance from the visual sensor 400, as the operation target object region.

However, in operation S211, it has been described that the candidate object region is selected among the plurality of candidate object regions having the z-axis rotation angles included in the predetermined angle range, but the selection of the candidate object region is not limited to the rotation angle in the z-axis, and the candidate object region may be selected among the plurality of candidate object regions having the x-axis rotation angles or the x-axis rotation angles included in the predetermined angle range. The range of one or more rotation angles may be first limited, and the distance from the visual sensor 400 may be first limited. If the candidate object region has an angle and a distance from the visual sensor 400 at which the picking robot can most appropriately grip and pick the object, the candidate objection region is sufficiently selected as the operation target object region regardless of a reference based on which the object model is selected.

Next, in operation S212, the rotation angle of the object model compared with the selected operation target object region and the distance from the visual sensor 400 is set as operation target object information, and the method proceeds to operation S213.

According to the object detecting device and the object detecting method of exemplary embodiment 2, in addition to an advantage obtained from exemplary embodiment 1, the distance from the visual sensor 400, as well as the rotation angles in the x, y, and z-axes, is used in the detection of the object. Accordingly, it is possible to detect an object with higher accuracy.

As described above, the present invention has been described with reference to the exemplary embodiment of the present invention, but those skilled in the art will understand that the present invention may be variously modified and changed within the scope without departing from the spirit and the area of the present invention defined in the claims. Accordingly, the spirit of the present invention should be recognized by the claims described below, and all of the equal or equivalent changes thereof shall belong to the scope of the spirit of the present invention.

What is claimed is:

1. A device for detecting an object comprising a non-transitory computer readable medium with computer executable instructions stored thereon which, when executed by a processor, perform the following operations:

obtaining an image of objects from a visual sensor;

extracting one or more local characterized parts from the image;

detecting one or more object regions formed by a combination of the one or more extracted local characterized parts;

storing predetermined rotation angles of an object models corresponding to the objects, and object regions of the object model obtained for each predetermined rotation angle in a storage;

comparing the detected one or more object regions with the object regions of the object models stored in the storage unit, and extract one or more candidate object regions;

selecting a candidate object region as an operation target object region conforming to a predetermined determination reference among the one or more candidate object regions; and outputting a rotation angle of the object model compared with the operation target object region as operation target object information, wherein, when the one or more candidate object region is a single candidate object region, the single candidate object region is selected as the operation target object region, and wherein, when the one or more candidate object region includes a plurality of candidate object regions, a candidate object region having a smallest absolute value of rotation angle among the plurality of candidate object regions is selected as the operation target object region.

2. The device of claim 1, wherein the operations further comprise:

determining whether the detected one or more object regions are included within a predetermined error range by comparing the detected one or more object regions and the object regions stored in the storage; and extracting the object region included in the predetermined error range as the one or more candidate object region.

3. The device of claim 1, wherein the storage further stores the distance from the object model to the visual sensor, and wherein the object regions of the object model are obtained for each respective predetermined rotation angle and for each respective predetermined distance.

4. The device of claim 3, wherein when the one or more candidate object regions include a plurality of candidate regions, a candidate object region is selected from among the plurality of candidate object regions compared with the object models, which has a rotation angle included in a predetermined range of the rotation angles of the object models, and has the smallest distance from the visual sensor, as the operation target object region.

5. The device of claim 1, wherein the operations further comprise:
preprocessing the image obtained from the visual sensor before extracting the one or more local characterized parts.

6. An object picking system, the system comprising:
the device for detecting an object according to claim 1;
a picking robot controller; and
a picking robot accessed with the picking robot controller, wherein the picking robot controller controls the picking robot to pick an operation target object corresponding to operation target object information.

7. A method of detecting an object, comprising:
obtaining an image of objects from a visual sensor;
extracting one or more local characterized parts from the image;
detecting one or more object regions formed by a combination of the one or more extracted local characterized parts;
comparing the detected one or more detected object regions with pre-stored object regions of object models corresponding to the objects, and extracting one or more candidate object regions;
selecting a candidate object region as an operation target object region conforming to a predetermined determination reference among the one or more candidate object regions; and
outputting a pre-stored rotation angle for the object model compared to the operation target object region as operation target object information,
wherein selecting the candidate object region includes, when the one or more candidate object regions is a single candidate object region, selecting the single candidate object region as the operation target object region, and
wherein selecting the candidate object region further includes, when the one or more candidate object regions include a plurality of candidate object regions, selecting the operation target object region based on pre-stored rotation angles for the object models compared with the plurality of candidate object regions and pre-stored distance from the visual sensor to the object model.

8. The method of claim 7, wherein comparing the detected one or more object regions includes:
comparing the one or more detected object regions and the pre-stored object regions of the object models and determining whether the one or more detected object regions are included within a predetermined error range, and extracting the object region included in the predetermined error range as the one or more candidate object region.

9. The method of claim 7, wherein the operation target object region corresponds to a candidate object region having a smallest absolute value of rotation angle among the plurality of candidate object regions.

10. The method of claim 7, wherein selecting the candidate object region further includes:
when the one or more candidate object regions include the plurality of candidate object regions, selecting a candidate object region among the plurality of candidate object regions compared with the object models, which has a rotation angle included in a predetermined range of the rotation angles of the object models, and has the smallest distance from the visual sensor, as the operation target object region.

11. The method of claim 7, wherein outputting the pre-stored rotation angle includes outputting the pre-stored rotation angle for the object model compared with the operation target object region and the pre-stored distance from the visual sensor as the operation target object information.

12. The method of claim 7, further comprising:
pre-processing the obtained image,
wherein extracting one or more local characterized parts includes extracting the local characterized part from the pre-processed image.

* * * * *